United States Patent
Lindskog et al.

(10) Patent No.: US 8,300,573 B2
(45) Date of Patent: Oct. 30, 2012

(54) TIMER HANDLING IN A TRANSMITTER IN A TELECOMMUNICATION SYSTEM FOR VOICE AND DATA PACKET TRANSMISSION

(75) Inventors: Jan Lindskog, Pixbo (SE); Roger Wallerius, Sävedalen (SE); Pär Ankel, Nödinge (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 329 days.

(21) Appl. No.: 12/681,277

(22) PCT Filed: Oct. 3, 2007

(86) PCT No.: PCT/EP2007/060496
§ 371 (c)(1),
(2), (4) Date: Apr. 1, 2010

(87) PCT Pub. No.: WO2009/043375
PCT Pub. Date: Apr. 9, 2009

(65) Prior Publication Data
US 2010/0246513 A1    Sep. 30, 2010

(51) Int. Cl.
*H04B 7/185* (2006.01)
*H04B 7/00* (2006.01)
*H04W 4/00* (2009.01)
*H04L 12/28* (2006.01)
*H04L 12/56* (2006.01)

(52) U.S. Cl. ......... 370/318; 370/329; 370/394; 455/522

(58) Field of Classification Search ................ None
See application file for complete search history.

(56) References Cited

U.S. PATENT DOCUMENTS

| 5,666,654 | A * | 9/1997 | Kanai ............................ 455/512 |
| 5,706,278 | A * | 1/1998 | Robillard et al. ............ 370/222 |
| 7,403,791 | B2 * | 7/2008 | Oki et al. ...................... 455/522 |
| 2006/0209896 | A1 * | 9/2006 | Choi et al. .................... 370/469 |
| 2007/0173279 | A1 * | 7/2007 | Kuroda et al. ................ 455/522 |
| 2007/0184863 | A1 * | 8/2007 | Takagi et al. ................ 455/507 |

OTHER PUBLICATIONS

3GPP TS 25.309, "3rd Generation Partnership Project; Technical Specification Group Radio Access Network; FDD Enhanced Uplink; Overall description; Stage 2 (Release 6)", Dec. 2005, Version 6.5.*
3GPP TS 25.211, "3rd Generation Partnership Project; Technical Specification Group Radio Access Network; Physical Channels and mapping of transport channels onto physical channels (FDD) (Release 6)", Dec. 2005, Version 6.7.*
3GPP TS 25.321, "3rd Generation Partnership Project; Technical Specification Group Radio Access Network; Medium Access Control (MAC) protocol specification (Release 6)", Dec. 2005, Version 6.7.*

* cited by examiner

*Primary Examiner* — Andrew Chriss
(74) *Attorney, Agent, or Firm* — Roger S. Burleigh

(57) ABSTRACT

The invention relates to a wireless telecommunication system for voice and data packet transmission. The system comprises a transmitting unit for transmitting voice and data packets to a receiving unit. The transmitting unit comprises a first discard timer set for a first time period and arranged to start when a first data packet is transmitted from the transmitting unit. The transmitting unit is arranged to suspend the first discard timer when a second power is lower than or equal to a selected second threshold level.

24 Claims, 13 Drawing Sheets

US 8,300,573 B2

TIMER HANDLING IN A TRANSMITTER IN A TELECOMMUNICATION SYSTEM FOR VOICE AND DATA PACKET TRANSMISSION

TECHNICAL FIELD

The invention relates to a wireless telecommunication system and method for voice and data packet transmission. The system comprises a transmitting unit for transmitting voice and data packets to a receiving unit. The transmitting unit has a maximum power and is arranged to transmit high priority data on a first dedicated channel with a first power being of a magnitude within a first range ranging from zero to the difference between the maximum power and a selected first threshold level and low priority data on a second dedicated channel with a second power being of a magnitude within a second range ranging from zero to the difference between the maximum power minus the first power minus the first threshold level. The transmitting unit comprises a first discard timer set for a first time period and arranged to start when a first data packet is transmitted from the transmitting unit. The transmitting unit is arranged to discard the first data packet if it has not been acknowledged by the receiver within the first time period or after a predetermined number of retransmissions of the first data packet.

BACKGROUND

The invention relates to Wireless data transmission using High-Speed Downlink Packet Access, denoted HSDPA, in a downlink direction, and especially timer handling in a transmitter such as NodeB. The invention relates also to wireless data transmission using High-Speed Uplink Packet Access, denoted HSUPA, in an uplink direction, and especially timer handling in a transmitter such as the User Equipment (UE). The focus of the invention is upon the use of a timer T1_NodeB for HSDPA traffic in NodeB being similar to a timer T1_UE in the UE for HSUPA traffic.

FIG. 1 schematically shows High-Speed Downlink Shared Channel (HS-DSCH) in NodeB and FIG. 2 schematically shows HS-DSCH in an UE. FIGS. 1 and 2 relate to the downlink direction, i.e. from NodeB to the UE.

With HSDPA, a new acknowledged protocol between the NodeB and the UE is introduced. NodeB buffers incoming downlink end user data and utilizes an internal scheduling entity to determine when to transmit buffered data. The aim of the scheduling decision is that the NodeB continuously receives channel quality estimates from the UE entities. NodeB also has knowledge about UE receiver capabilities.

At a pace of up to 500 times per second NodeB transmits Medium Access Control High Speed, hereinafter called MAC-hs, Protocol Data Units, PDUs, to the UEs. At each 2 ms transmit opportunity NodeB can vary the MAC-hs PDU size depending on buffered amount of data, channel quality estimates, UE capabilities and granted amount of downlink codes available. For each MAC-hs entity, data for one UE or up to fifteen UEs can be scheduled at each 2 ms transmit opportunity utilizing code division among the scheduled UEs. The UE decodes a HSDPA control channel, denoted High-Speed Shared Control Channel (HS-SCCH), and upon a successful CRC checksum the UE continues to decode the HSDPA packet data channel, denoted High-Speed Physical Downlink Shared Channel (HS-PDSCH).

Depending on the outcome of the HS-SCCH and HS-PD-SCH the UE transmits a reception feedback back to the peer NodeB. The reception feedback is interpreted by the NodeB sender, and upon a negative feedback indicating a reception failure for the UE NodeB retransmits the data, or in absence of UE feedback, i.e. Discontinuous Transmission DTX, NodeB retransmits the data.

MAC-hs PDUs are numbered by modulo Transport Sequence Number, hereinafter called TSN, cycling through the field 0 to 63. The MAC-hs constitutes of multiple Hybrid-Automatic Repeat-reQuest, hereinafter called HARQ, processes, where each HARQ process transmits a MAC-hs PDU and awaits either an ACKnowledgement, hereinafter called ACK, or Negative Acknowledgement, hereinafter called NACK, meaning that the receiver did not correctly decode the MAC-hs PDU, or absence of feedback, DTX. The round trip time comprises the time from MAC-hs PDU transmission until reception of the feedback ACK/NACK is fixed, except for the air interface propagation delay. Upon the reception of a NACK the MAC-hs sender retransmits the MAC-hs PDU. The reason for having multiple HARQ processes is because the round trip time is in relative terms long so if only one HARQ process is available, the total transmission time t over total connection time T, hereinafter called t/T would be low. This means that; while one process awaits a response, another HARQ process, or multiple HARQ processes, transmits. As a result of this, t/T can be 100 percent.

The MAC-hs protocol is semi-reliable meaning that the MAC-hs entity on the transmitting side can discard MAC-hs PDUs that have been transmitted and possibly retransmit ones or several times to the MAC-hs entity on the receiving side.

The reason for discarding a MAC-hs PDU is to prevent unnecessary retransmissions over the radio link where the MAC-hs receiver has moved to another cell, has powered down, or due to any other reason is not capable of receiving data, and is done either at a predetermined time after first transmission or a maximum number of retransmissions, or at a combination of both.

The MAC-hs receiver at the UE utilizes a receiver window with the purpose of mitigating the effect of when PDUs are received in non-ascending sequence order (which can occur due to retransmissions). Whenever a MAC-hs PDU is successfully decoded with TSN equal, the next_expected_tsn, the receiver can deliver PDUs to the RLC layer. Depending on whether the subsequent TSN number (i.e. next_expected_tsn+1) is already successfully decoded that MAC-hs PDU can also be delivered and so forth. The receiver window is updated accordingly. Delivery to the RLC layer from the MAC-hs protocol is done in sequence.

To recover from the situation where e.g. the sender has discarded a MAC-hs PDU, the receiver utilizes the two below described mechanisms to solve the problem:

1) Timer Based Stall Avoidance:

At the reception of a PDU with TSN>next_expected_tsn the receiver starts a timer denoted T1. When the timer expires the receiver take proper actions to allow for subsequent PDUs to be received. The exact details are described in 3GPP 25.321 chapters 11.6.2.3.2.

This behavior is also illustrated in FIG. 5.

2) Window Based Stall Avoidance:

The receiver window denoted window_size is <32 and comprises all TSNs within the range [highest_received_tsn−window_size+1, highest_received_tsn].

Example

A window_size equal to 8, and highest_received_tsn equal to 9 means that the receiver window comprises the following sequence numbers 2, 3, 4, 5, 6, 7, 8, 9.

Upon the reception of a MAC-hs PDU with TSN outside the received window, i.e. not within [highest_received_tsn− window_size+1, highest_received_tsn], the receiver shall set its highest_received_tsn equal to the TSN of the MAC_hs PDU and shift its leading edge (highest_received_tsn) of the receiver window.

When the leading edge of the receiver window advances, received but not yet delivered MAC-hs PDUs that are no longer within the receiver window shall be delivered to the RLC layer. A person skilled in the art will appreciate that TSN number in the receiver window may wrap around due to the modulo counting from TSN=63 to TSN=0.

This behavior is illustrated in FIG. 6.

Discard Timers at NodeB:

In NodeB Application Part (NBAP) signal Radio Link Setup Request, and NBAP signal Radio Link Reconfiguration Request, the RNC has the ability to include an optional field, denoted Discard Timer, for a specific priority queue in the HS-DSCH MAC-d flow, hereinafter denoted T1_coarse.

When used, NodeB shall timestamp each protocol data unit that is received from RNC for the particular HSDPA priority queue. Note that a UE may have several priority queues.

T1_coarse defines the time each protocol data unit is eligible for transmission, and NodeB shall discard out-of-date protocol data units.

The T1_course can be used to control the traffic for delay sensitive data.

The T1_course allows for an operator to have control over the waiting time from that data is received from RNC until it is scheduled for transmission from a HARQ process by the NodeB MAC-hs scheduler.

It does not however control the time each HARQ process will consume to complete its task.

At the UE, the use of the T1 timer allows an operator to have control over the time a UE will try to receive a particular MAC-hs PDU.

Even though it is not required by 3GPP, it is very likely that a NodeB vendor will utilize a second discard timer, hereinafter denoted T1_NodeB, in order to control the time consumed by each HARQ process. The T1_NodeB is "similar to the T1 timer" in UE in the sense that its purpose is to predict the resulting effect of the UE T1 timer, i.e. to avoid unnecessary transmission where transmitted MAC-hs PDUs are discarded as a result of the T1 timer in the UE. The reasons for such a statement are among several:
 1. The fact that a T1 timer is used at the UE motivates the use at the sending NodeB side, e.g. the timer and window base stall avoidance will sometimes cause the UE receiver to deliver incomplete MAC-hs PDU sequences (example TSN 2, 3, 5, 6, 7) to its higher layer. Continuing transmission of, in this case TSN=4, is of no use since the UE re-ordering entity will discard it.
 2. It is unwise to endlessly continue transmission for an UE that is not capable of receiving the data, e.g. assume that the UE due to bad radio conditions is not capable of decoding the HS-SCCH. An endless retransmission in this case is just a waste of bandwidth resources.

Examples of NodeB T1_NodeB implementations are:

(I) Either NodeB has implemented one timer per HARQ process where each timer works independently of each other and starts at the first transmission (at each new TSN) of MAC-hs PDU. The timer will continue until an ACK is received that will suspend the timer. If the timer expires the MAC-hs PDU will be discarded.

(II) A combination of both a timer, as described above, plus a counter that counts the amount of retransmission of MAC-hs PDU. If either the timer expires or the amount of retransmission increase above a threshold, the MAC-hs PDU is discarded.

FIG. 3 shows the E-DCH parts in the NodeB where;

L1 processing refers to the layer 1 decoding of the general parts of the DPCCH, E-DPCCH and E-DPDCH channels. MAC-e and E-DPCCH decoding 1-n refer to the decoding for a specific UE done in Node-B and the resulting information sent to the EUL schduler (e.g. Happy/Unhappy information) and to the HARQ receivers.

HARQ entities 1-m refer to the HARQ receiver functionality necessary for decoding of the E-DPDCH which exists for UE 1-n. HARQ entities send information to the E-DCH FP part and feedback messages to the UE via the RGCH/HICH Processing part.

E-DCH FP refers to the general handling to transmit decoded data and control information sent to RNC over the Iub interface and to receive Transport Network Congestion Indication (TCI) from the RNC.

Scheduler entity is responsible for determining exact scheduling grants to the UEs sent via the AGCH Processing. Scheduling entity is also responsible for decoding TCI messages from the RNC, sending RGCH messages via the RGCH/HICH processing unit, and controlling the amount of decoding resources per UE used in the L1 Processing, MAC-e & E-DPCCH decoding and HARQ entities.

RGCH/HICH processing 1-n comprises the specific RGCH and HIGH coding per UE.

AGCH Processing comprises the specific AGCH coding.

Layer 1 Processing comprises the general layer 1 coding for E-AGCH and E-RGCH/HICH channels.

F-DPCH/DPCH channel used to power control all uplink channels from a UE is not shown in this figure.

FIG. 4 shows the E-DCH parts in the UE, where;

L1 processing refers to the general decoding of the E-AGCH and E-RGCH/HICH channels.

RGCH/HIGH Processing refers to the specific decoding of the RGCH and HIGH channel. AGCH Processing refers to the specific decoding of the AGCH channel.

EUL Ctrl comprises the overall control of the EUL sending entity, such as monitoring the input buffer queues per Mac-d flow from higher layer, control of transmit queue selection, control of the MAC-es header, control of HARQ processes, relay of HIGH feedback to correct HARQ process, control of the MAC-e header.

MAC-es Processing refer to the coding of the MAC-es header and payload.

HARQ processes 1-m refer to the transmit HARQ procedure.

MAC-e Processing refer to the coding of the MAC-e header information.

F-DPCH/DPCH channel used to power control the UE is not shown in this figure.

Here, E-DCH refers to the uplink direction, i.e. from the UE to NodeB.

In release 6 of the WCDMA (Wideband Code Division Multiplex Access) specification, a High Speed Uplink Packet Access (HSUPA (also called E-DCH)) communication scheme is defined in addition to the downlink High Speed Packet Data Access (HSPDA) scheme in order to match the bit rates provided by the latter, so as to cater for improved interactive, background and streaming services. In prior art document 3GPP TS 25.309 is "FDD Enhanced Uplink; Overall Description; Stage 2". Version V6.6.0 of 2006-04-06 the Enhanced UL is described.

Relevant sections can moreover be found in 3GPP References TS25.211, TS25.321.

With scheduling, the NodeB is provided with the tools to influence the UE Transport Format Combination (TFC) selection for the E-DCH. E-DCH scheduling is based on scheduling grants sent by the NodeB to the UE and setting an upper limit on the E-DCH data rate, and scheduling requests, sent from the UE to the NodeB to request permission to transmit at a higher rate than currently allowed. In this invention we use the term scheduled data when referring to the E-DCH data sent by the UE as a consequence of Node-B sending scheduling grants.

The E-DCH also supports non-scheduled transmissions denoted non-scheduled data in this invention, i.e., transmissions that may take place regardless of the serving grant. The amount of bits allowed in a non-scheduled MAC-e PDU is configured per MAC-d flow through Radio Resource Control (RRC) signalling. Fundamentally, non-scheduled transmissions are required for scheduling requests (obviously the system would not operate properly without this possibility), but can also be used for Signal Radio Bearers (SRBs) and guaranteed bitrate services such as VoIP.

The HSUPA network comprises a Core Network communicating with a Radio Network Controller (RNC) over an Iu interface. The network also comprises a number of base stations NodeBs communicating with the RNC over an Iub interface. Each NodeB comprises an EUL scheduler unit (EUL_SCH). The EUL Scheduler unit is also denoted the MAC-e Scheduler, and is arranged to communicate with the RNC over respective Iub interfaces. The UE communicates with each NodeB over an air interface.

The following HSUPA channels are transmitted over the air interface; the E-DCH Absolute Grant Channel (E-AGCH) to convey absolute grant signalling from the MAC-e scheduler towards the UEs, the E-DCH Relative Grant Channel (E-RGCH) for relative grant signalling, E-DCH Hybrid Indicator Channel (E-HICH) to convey acknowledgement feedback from NodeB decoding of UE transmitted data, Dedicated Physical Channel (DPCH) or Fractional DPCH to convey Transmit Power Control (TPC) commands, Enhanced DPDCH (E-DPDCH) to convey the MAC-e payload and Enhanced DPCCH (E-DPCCH) to convey the control signalling of the MAC-e.

Document 3GPP TS 25.309 FDD, Enhanced Uplink Overall description, gives an overview of the Enhanced Uplink specification.

In prior art document "High Speed Uplink Packet Access (HSUPA); White Paper, application note 1MA94", Rohde Schwarz, 01.2006, an overview of the HSUPA can also be found.

According to the HSUPA specification, the Enhanced Dedicated Channel (E-DCH) high speed uplink transport channel offers a number of new features such as: short Transmission Time Interval (TTI), Fast Hybrid Automatic Repeat Request (ARQ) with soft recombining, fast scheduling for reduced delays, increased data rates and increased capacity.

When a UE is setting up communication with a NodeB, the setup procedure may be followed by a HSDPA session, for e.g. downloading/surfing an internet page using Transmission Control Protocol (TCP). Depending on the capabilities of the user entity, this may moreover involve HSUPA transmissions whereby NodeB, that transmits TCP messages on the HSDPA downlink channel will receive TCP acknowledgements on the E-DCH uplink to NodeB. Since NodeB determines, or schedules, at which pace an UE shall transmit on E-DCH, NodeB utilises the E-AGCH to convey its scheduling decisions. A shorter delay, measured from the time until a TCP data segment is sent downlink until a TCP acknowledgement as a response is sent uplink, leads to a decreased downloading time of file transfers etc, due to the shorter round trip time estimate of the TCP layer.

Even though it is not required by the 3GPP, it is very likely that a UE vendor will utilize a discard timer, hereinafter denoted T1_UE, in order to control the time consumed by each HARQ process in the UE. The T1_UE is "similar to the T1 timer" in RNC in the sense that its purpose is to predict the resulting effect of the RNC T1 timer, i.e. to avoid unnecessary transmission where transmitted MAC-es PDUs are discard as a result of the T1 timer in the RNC.

Problems with Existing Solutions:

With reference to FIG. 7, HSDPA will utilize the 'unused power' as will be explained below. A continuous line shows the power usage of the power controlled dedicated channels DCH for high priority data such as voice and e.g. streaming services sent on Dedicated Physical Channels (DPCHs), and the power required for the Fractional Dedicated Physical Channels (F-DPCHs). A broken line represents the power to be used by NodeB for HS-DSCH.

Also with reference to FIG. 7 a similar situation will arise for HSUPA in an UE that will use the 'unused power' for the scheduled data part of HSUPA. A continuous line shows the power usage for the dedicated channel DCH for high priority data such as voice, VoIP or e.g. streaming services, and the power required for the Dedicated Physical Control Channel (DPCCH). The DCH data is assumed to be sent in a Dedicated Physical Data Channel (DPDCH) or as non-scheduled data in HSUPA. A broken line represents the power to be used by the scheduled data part of the E-DCH for the UE.

The broken line is not correctly weighted with reference to the axes of the graph. However, it is obvious that the broken line and the continuous line are each others inverse since the HSDPA/HSUPA can use only the power not being used by the DCH, i.e. when the fully drawn line is at the maximum power Emax the broken line has reached its minimum value close to or equal to zero. The minimum value will hereinafter be referred to as a "power drop".

During the power drop, the HSDPA/HSUPA cannot be allowed to use any power. The periodicity or point in time of these HSDPA/HSUPA power drops is not known.

FIG. 8 shows the true power usage of the HSDPA, i.e. when a first threshold value Eth1 has been taken out of the equation. The first threshold value Eth1 marks the power used for Common channels. With Common channel we refer to channels being addressed to more than one UE or channel such as the AGCH channel which is a shared channel. The Common channels are among others the Synchronisation Channel (SCH), Common Pilot Channel (CPICH), Primary Common Control Physical Channel (P-CCPCH), Secondary Common Control Physical Channel (SCCPCH), E-AGCH and E-HICH/E-RGCH. A person skilled in the art will observe that the power used by the common channels (Eth 1) is not constant and will change from time to time, but in order to illustrate the problem it is shown as a constant power. Further on, it will be appreciated by a person skilled in the art that transmissions of common channels are only valid for NodeB and not for a UE. Eth 1 is subsequently zero when representing the problems arisen in UE for HSUPA transmission. Emax represents maximal power to be used for NodeB and UE. It will be appreciated by a person skilled in the art that Emax for the UE may be dependent upon regulatory issues such as maximal allowed transmit power, thermal limitations, to maximal energy consumptions limitation where the UE is powered from a USB or PCMCIA interface, or due to temporary energy storage limitation where the UE utilises a capacitor to store energy for transmission. Both FIGS. 7 and 8 will be further described below in connection with the description of the invention.

The problem is now what happens when a HARQ process has transmitted MAC-hs/MAC-e PDU prior to such a power drop.

To exemplify the problem the following scenario is described for a HSDPA scenario:

a) Assume that NodeB receives data to one UE from the RNC and no pending or ongoing transmissions from Node-B HARQ processes occur.
b) UE has no data in its reordering entity nor in its HARQ processes. Next_expected_tsn is 0, and highest_received_tsn is 63.
c) Assume further that NodeB has implemented on or other of the discard mechanisms described above (I or II).
d) NodeB transmit data from HARQ process 1 with TSN=0 and starts its T1_NodeB.
e) UE decodes HS-SCCH correctly but not HS-PDSCH which means that UE stores information in its HARQ process but no information will be sent to its reordering entity.
f) A power drop as described above prevents further transmissions of HSDPA from NodeB and the T1_NodeB eventually expires ➔ MAC-hs PDU in HARQ process 1 with TSN=0 is discarded.
g) The power drop expires and HSPDA transmissions are possible but since no data exists to be transmitted no transmissions will occur.

To recover from the previous example, the RNC has to retransmit data which will be sent from NodeB as TSN=1, which will trigger a T1 timer start in UE, which at expiration will deliver the data to the peer UE Radio Link Protocol (RLC).

More generally the problem can be described in that HSDPA power drops may lead to discarding of MAC-hs PDUs for which the amount of retransmissions are lower than expected, due to fewer occasions to re-transmit.

Note that with "expected" is meant that an operator may have set the T1_NodeB and number of retransmission such that e.g. all MAC-hs PDU should be retransmitted at least 3 times. These problems will arise when NodeB utilizes a timer based discard mechanism, for example according to I or II above or a combination thereof.

The same problem exists for a UE in the uplink direction, but here the transmitter in the UE utilizes High-Speed Uplink Packet Access, HSUPA in an uplink enhanced dedicated channel, E-DCH instead of HSDPA and HS-DSCH, and where the T1 timer is located in the RNC.

Hence there exists a need for an improved wireless telecommunication system for voice and data packet transmission where the above identified problems are solved.

SUMMARY

The object of the invention is to meet the above described need and to find a more efficient Wireless data transmission in a downlink direction and/or an uplink direction. The invention proposes to suspend a discard timer during power drops. The discard timer then continues when the power is back, if certain criteria are fulfilled. The risk or negative aspect of suspension is low compared to the positive side as will be seen below.

The wireless telecommunication system is intended for voice and data packet transmission and comprises a transmitting unit for transmitting voice and data packets to a receiving unit. The transmitting unit has a predetermined maximum power and is arranged to transmit high priority data, advantageously voice and/or high priority data communication, on a first dedicated channel with a first power being of a magnitude within a first range ranging from zero to the difference between the maximum power and a selected first threshold level; and low priority data on a second dedicated channel with a second power being of a magnitude within a second range ranging from zero to the difference between the maximum power minus the first power minus the first threshold level. The transmitting unit comprises the discard timer which is set for a first time period and arranged to start when a first data packet is transmitted from the transmitting unit. The transmitting unit is arranged to discard the first data packet if it has not been acknowledged by the receiver within the first time period or after a predetermined amount of retransmissions of the first data packet.

Here, "predetermined maximum power" means a selected power that can change over time, i.e. the maximum power can have one value at one point in time and another value at a different point in time. The NodeB is normally more static than the UE with regard to fluctuation of the maximum power.

The invention is characterized in that the transmitting unit is arranged to suspend the first discard timer when the second power is lower than or equal to a selected second threshold level. The latter refers especially to the case where the second threshold level is zero, but can be valid also for a value above zero.

One advantage of the invention is that unnecessary RLC retransmissions can be prevented in the case where a power drop has prevented the data packet from being transmitted and acknowledged.

The transmitting unit can be comprised in a radio base station, NodeB arranged to use HSDPA in a downlink direction. The second power is then the power used for HSPDA transmission. The first discard timer is then suspended when the HSPDA power is lower than the selected second threshold level due to traffic on the dedicated downlink channel DCH.

The transmitting unit can also be comprised in a user equipment arranged to use High-Speed Uplink Packet Access, HSUPA, which is a 3G mobile telephony protocol in the HSPA family currently with uplink speeds up to 5.76 Mbit/s. The specifications for HSUPA are included in Universal Mobile Telecommunications System Release 6 standard published by 3GPP. HSUPA uses an uplink enhanced dedicated channel, E-DCH, on which it will employ link adaptation methods similar to those employed by HSDPA.

Hence, the user equipment is arranged to use HSUPA in an uplink direction. The second power is then the power used for HSUPA and the maximum power is the maximum transmit power of the UE. The first discard timer is suspended when the HUSPA power is lower than the selected second threshold level due to power limitation on the UE and/or traffic on the first dedicated channel for uplink.

The first discard timer T1_NodeB/T1_UE is comprised in a HARQ process which, upon reception of an acknowledgment signal (ACK) indicating that a transmitted MAC-hs Protocol Data Unit (PDU)/MAC-e PDU was successfully received shall report a successful outcome to an internal MAC-hs scheduler/MAC-e control unit. Here, reference is made to FIGS. 1-4, where "MAC-hs scheduler" is comprised in the downlink parts of the NodeB and "MAC-e control unit" is comprised in the uplink parts of the UE.

When the transmitting unit suspends the HARQ process extra time will be added to the first discard timer, for the HARQ process to get scheduling permissions from the scheduler/MAC-e ctrl unit in order to increase the probability for a successful reception at the receiving unit.

In another embodiment of the invention, the HARQ process is arranged to investigate if any HARQ process has received an ACK with a TSN>$TSN_{HARQ}$ where TSN is in

[lowest_transmitted_tsn, highest_transmitted_tsn]; if true the HARQ process shall resume the first discard timer (T1_NodeB, T1_UE).

The transmitter is arranged to use 3GPP or Long Term Evolution or is capable of Enhanced Uplink.

The invention will below be described in more detail.

BRIEF DESCRIPTION OF THE DRAWINGS

The invention will be described below with reference to a number of drawings. Prior art has been described above in connection to FIGS. 1-8, but the information in FIGS. 1-6 should be used in conjunction with FIGS. 8-12.

DETAILED DESCRIPTION

As mentioned above, prior art has been described above in connection to FIGS. 1-8, but in order to explain the invention references to FIGS. 1-8 are also made below together with references to FIG. 9-12.

Figure 7:
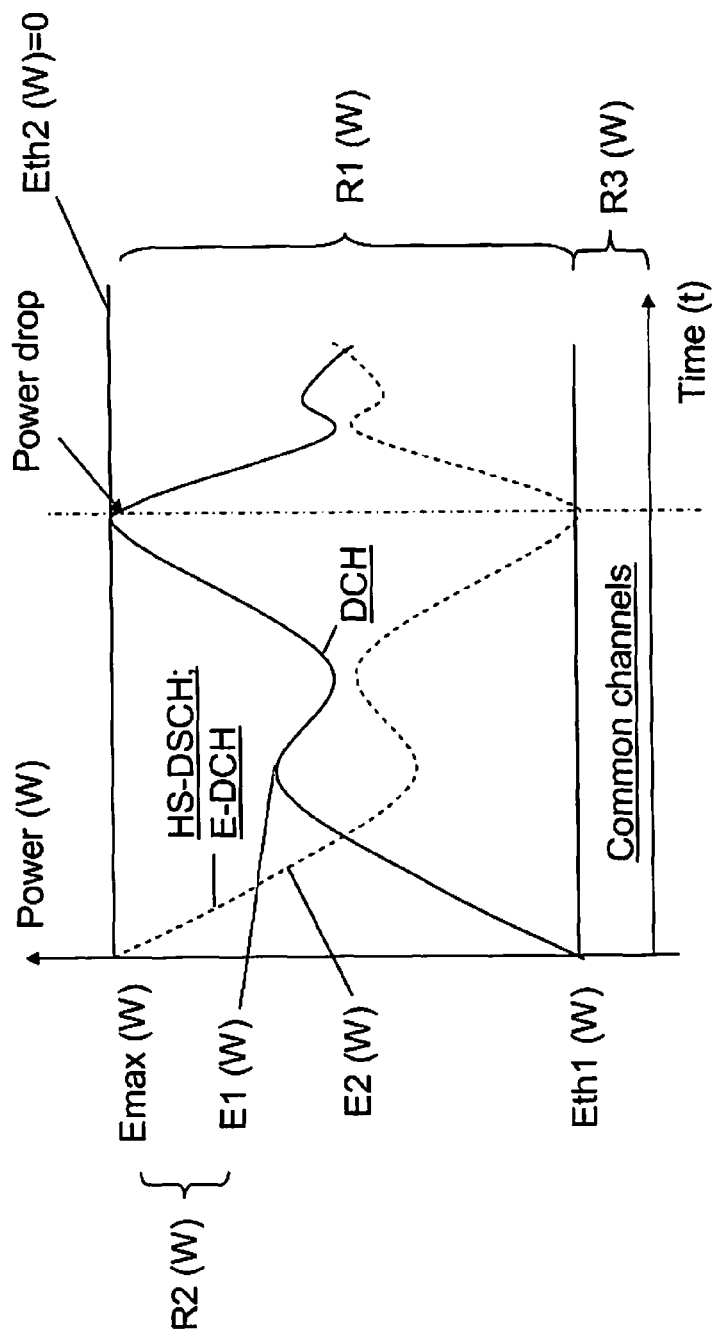
FIG. 7 schematically shows a power chart according to prior art on how HSDP/HSUPA utilizes the 'unused power' of the transmitter.

FIG. 7 shows the case where the transmitter is a NodeB and where HSDPA will utilize the 'unused power' as shown in the figure for downlink communication to UEs. A continuous line shows the power usage of the power controlled dedicated channels DCH for high priority data such as voice and or steaming services or Guaranteed BitRate, GBR, services. A broken line shows how the power of the DCH affects the power that is possible to be used by the HSDPA. It is obvious that the broken line and the continuous line are each others inverse since the HSDPA can use only the power not being used by the DCH, i.e. when the fully drawn line is at the maximum power Emax the broken line has reached its minimum value close to or equal to zero. The minimum value will hereinafter be referred to as a "power drop". During the power drop, the HSDPA cannot be allowed to use any power. It should be noted that the periodicity or point in time of these HSDPA power drops cannot be foreseen.

As mentioned above, the invention refers to a wireless telecommunication system for voice and data packet transmission utilizing HSDPA or HSUPA according to the above. The system comprises a transmitting unit in the NodeB or in the UE for transmitting voice and data packets to a receiving unit being NodeB or UE correspondingly. If the transmitting unit is NodeB, the receiving unit is the UE and vice versa. The transmitting unit NodeB; UE has, in any given point in time, a maximum power Emax and is arranged to transmit high priority data on a first dedicated channel DCH with a first power E1 being of a magnitude within a first range R1 ranging from zero to the difference between the maximum power Emax and a selected first threshold level Eth1; and low priority data on a second dedicated channel HS-DSCH; E-DCH with a second power E2 being of a magnitude within a second range R2 ranging from zero to the difference between the maximum power Emax minus the first power E1 minus the first threshold level Eth1.

Figure 8:
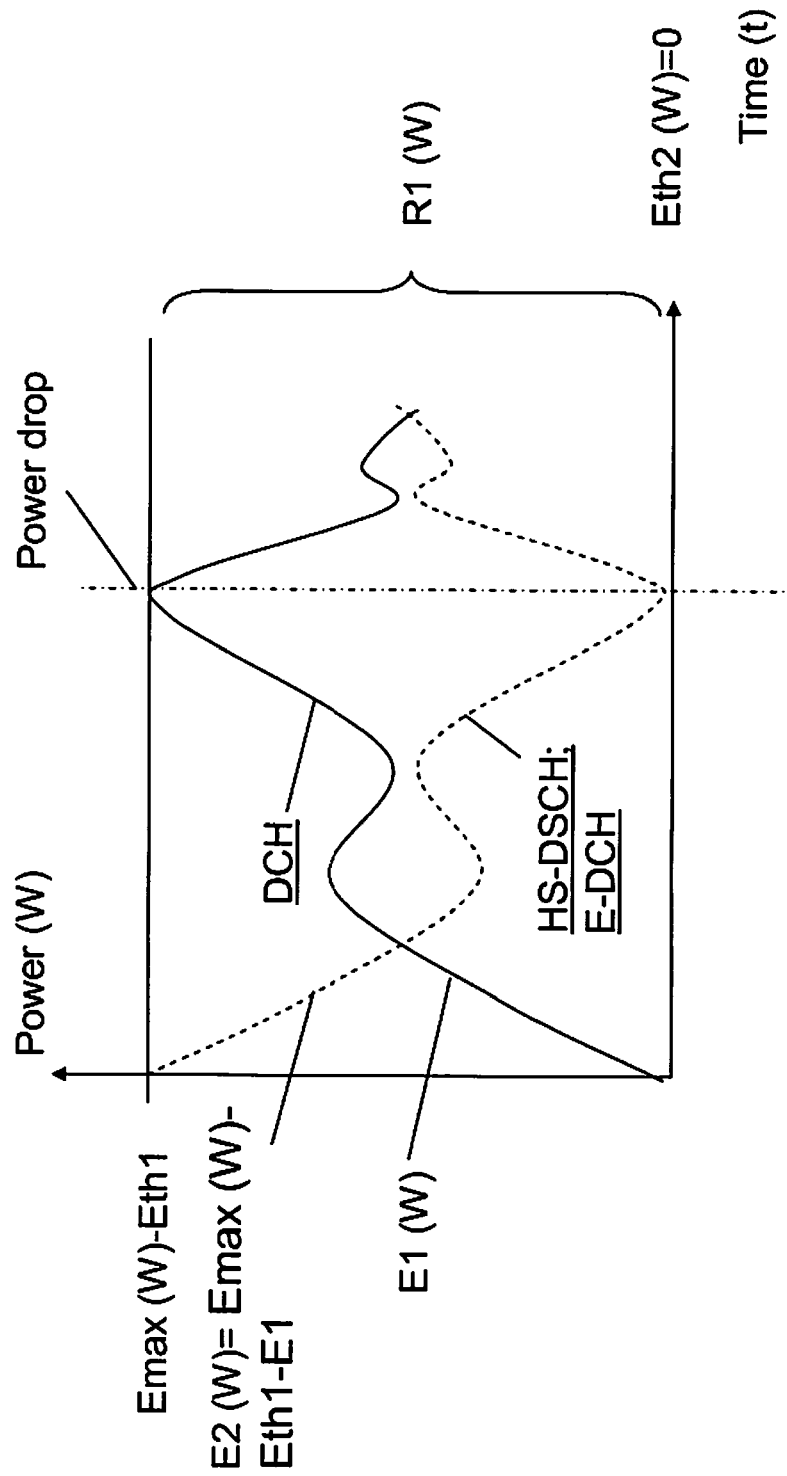
FIG. 8 schematically shows a power chart according to prior art on the true power usage of the HSDPNHSUPA.

FIG. 8 shows the true power usage of the HSDPA/HSUPA, i.e. the first threshold level has been subtracted from the possible available power. It is clear from the figure that E2=Emax−Eth1−E2, which means that E2 can only use the remaining power ranging from zero, when E2=Emax−Eth1 to Emax−Eth1, when E2 is zero.

Figure 9:
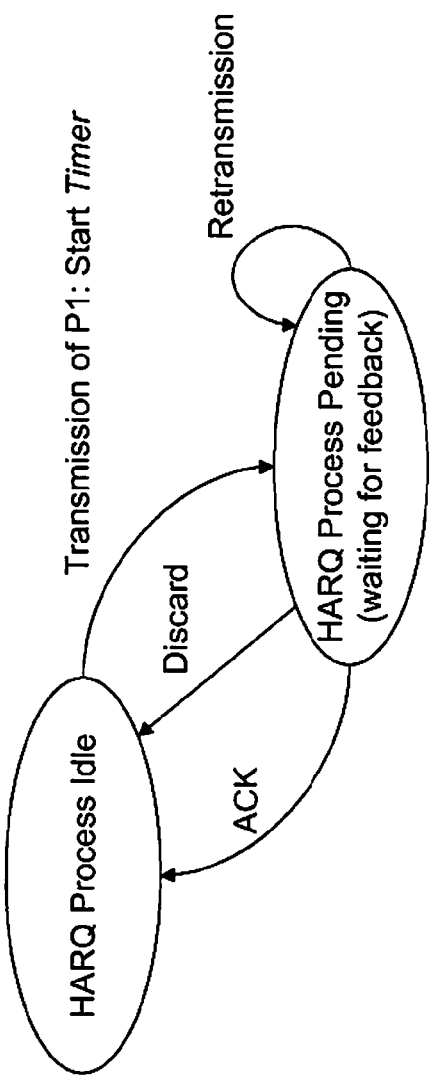
FIG. 9 schematically shows a state diagram according to prior art.

FIG. 9 shows a state diagram according to prior art. FIG. 9 shows a first discard timer T1_NodeB; T1_UE comprised in a HARQ process that is initiated at the first transmission of a data packet P1. The HARQ process is arranged, upon reception of an acknowledgment signal ACK indicating that the transmitted data packet P1 was successfully received, to report a successful outcome to an internal MAC-hs scheduler/MAC-e control unit, or to discard the P1 data packet if it has not been acknowledged by the receiver within the T1_NodeB; T1_UE or after a predetermined amount of retransmissions of P1 data packet.

Figure 10:
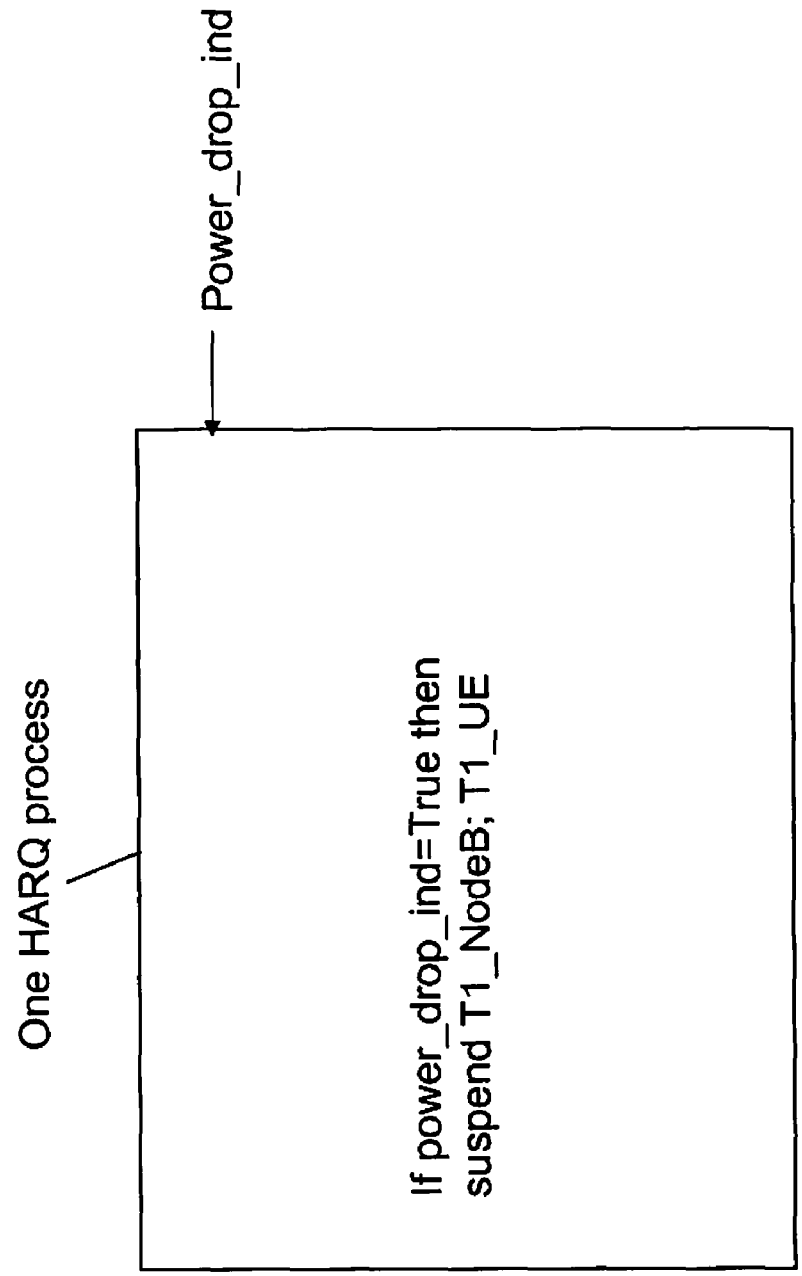
FIG. 10 schematically shows a flow chart of a method for one HARQ process according to the invention.

FIG. 10 schematically shows a flow chart of a method for one HARQ process according to the invention. Basically, FIG. 10 shows that if a power drop is indicated (Power_drop_ind) then the first discard timer T1_NodeB; T1_UE shall be suspended.

Figure 11:
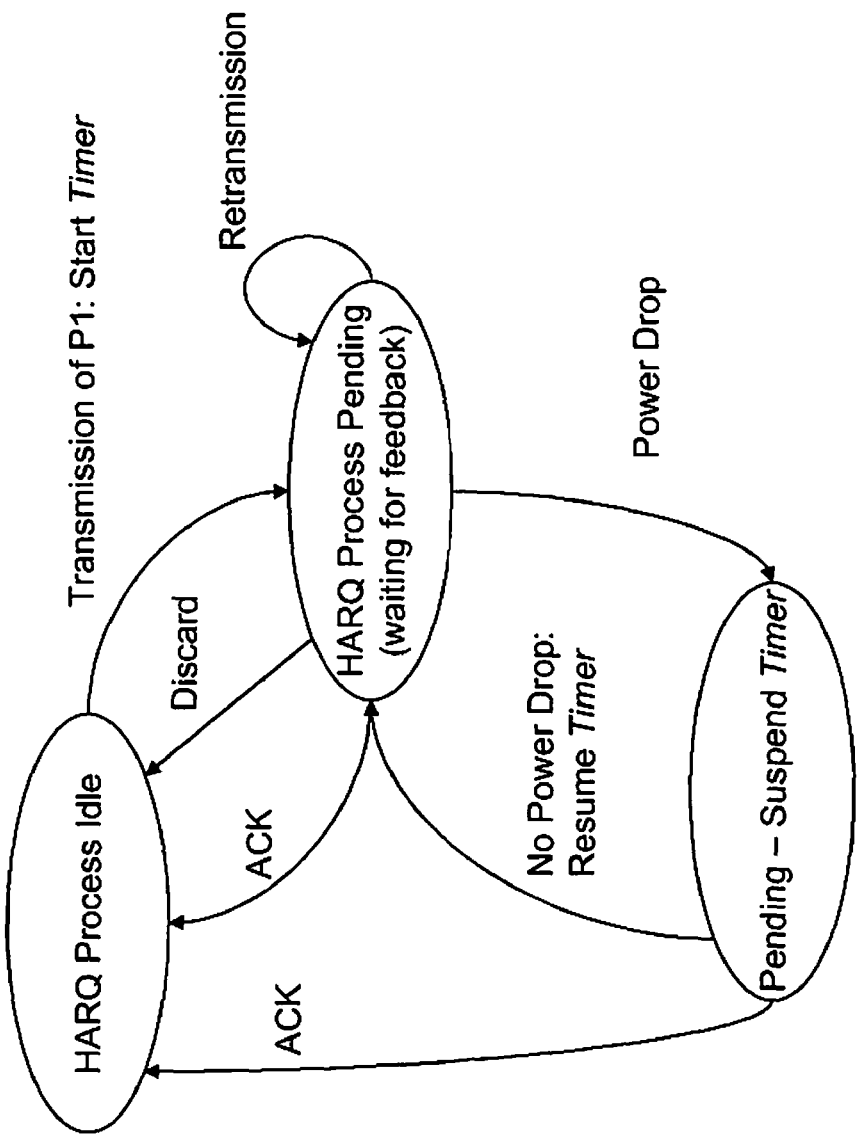
FIG. 11 schematically shows a state diagram according to a first embodiment of the invention.

With reference to FIG. 10, FIG. 11 schematically shows a state diagram according to a first embodiment of the invention. The transmitting unit according to the invention uses a HARQ process according to FIG. 9 and thus comprises a first discard timer T1_NodeB; T1_UE set for a first time period and arranged to start when a first data packet P1 is transmitted from the transmitting unit. The transmitting unit NodeB; UE is arranged to discard the first data packet if it has not been acknowledged by the receiver within the first time period or after a predetermined amount of retransmissions of the first data packet According to the invention, the transmitting unit NodeB; UE is arranged to suspend the first discard timer T1_NodeB; T1_UE when the second power E2 is lower than a selected second threshold level Eth2. The discard timer T1_NodeB; T1_UE is arranged to resume when the second power E2 is back, i.e. is above the selected second threshold level Eth2. The second threshold level Eth2 can be set to zero, which is indicated in FIGS. 7 and 8.

When the HARQ process receives an acknowledgment signal ACK indicating that a transmitted MAC-hs/MAC-e PDU was successfully received, the HARQ process is arranged to accept the acknowledgment signal ACK as a confirmation and shall report a successful outcome to an internal MAC-hs scheduler/MAC-e control unit. The HARQ process is arranged to accept the ACK before, during and after suspension of the discard timer T1_NodeB; T1_UE.

The motivation for NodeB to implement a T1_NodeB is primarily to prevent unnecessary retransmissions to occur. As mentioned above in connection to prior art, situations may and will occur when the UE timer and window base stall avoidance will deliver incomplete MAC-hs TSN sequence data to higher layer, i.e. RLC layer.

When the RLC layer operates in AM mode (Acknowledge Mode), the RLC layer will retransmit the missing data. Whether or not an RLC retransmission will cause the end user throughput to decrease depends upon many factors, e.g. end TCP states and RLC AM states as well as NodeB states, but in general it is wise to minimize the amount of RLC retransmissions because of the fact that HSDPA introduced a new retransmission entity in the 3GPP protocol suite.

So if the power drops occur infrequently one solution is of course to do nothing, but on the other hand, power drops may occur during major events where the downside of poor throughput would cause negative publicity for the wireless HSDPA operator. But again, the periodicities of the power drops are not known.

The proposed solution is to provide each HARQ process with an indication if a power drop is present, and suspend or inhibit or stop or hold the current T1_NodeB. When the power drop condition ceases the timer shall be started again.

If a HARQ process receives a positive feedback ACK that the transmitted MAC-hs was successfully received, the HARQ process shall accept the ACK as a confirmation and report a successful outcome to the internal MAC-hs scheduler. This may occur if the power drop occurs when a HARQ process has outstanding data that has been transmitted and is correctly received by the UE, but the HARQ process is unaware of the successful reception at the UE.

If every HARQ process now suspends each individual HARQ process T1_NodeB, extra time will be added for each HARQ process to get scheduling permissions from the scheduler and increased probability for a successful reception at the UE.

Exceptional Conditions:

When using the invention the T1_NodeB at NodeB may, due to power drops, expire later than the T1 timer at the UE. In general that is not preferred since the risk increases that a sending side transmits data whilst a receiving side rejects data.

Example a) Assume that a reordering entity in the UE has the following states:
next_expected_tsn=13
highest_received_tsn=14 (i.e. TSN=13 is missing)
this gives that a T1 timer is running
HARQ Process 1 has stored information from MAC-hs TSN=13.
b) HARQ process 1 in NodeB has a running T1_NodeB and has transmitted MAC_hs PDU TSN=13 one time.
c) A power drop occurs which gives that the timer is suspended in NodeB.
d) UE T1 timer expires which gives that the next_expected_tsn=15 and the highest_received_tsn=14
e) Power drop disappears and the HARQ 1 process retransmits TSN=13 which gives a successful reception at UE which in turn gives discarded data in a reordering entity.

The example illustrates an example when the general suspension of the T1_NodeB does not help. On the other hand is the protocol is robust against this behavior and no harm will be made.

Figure 12:
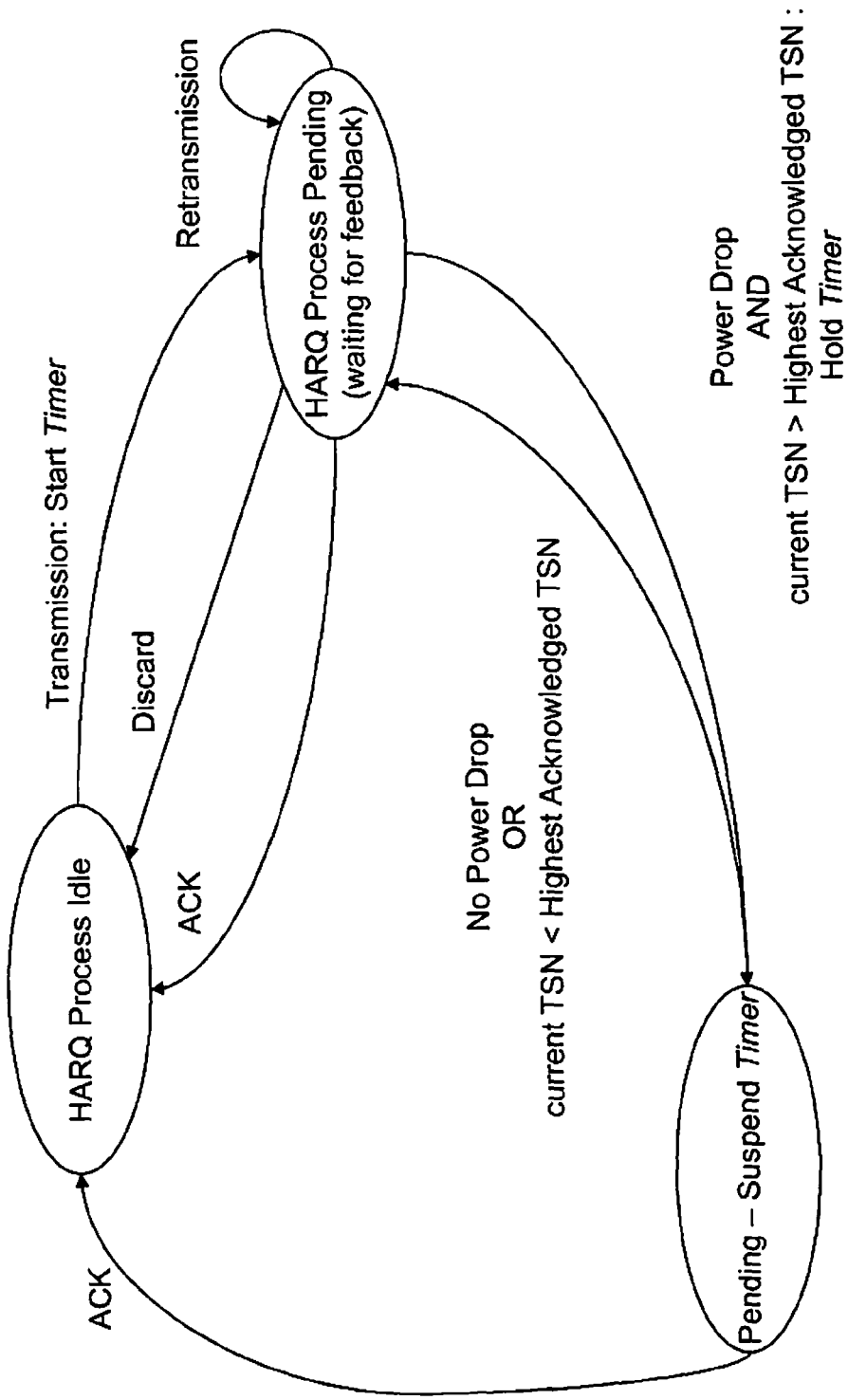
FIG. 12 schematically shows a state diagram according to a second embodiment of the invention.

With reference to FIG. 10, FIG. 12 schematically shows a second embodiment of the invention, and the following is proposed in order to overcome the negative effect of the example in the first embodiment.

Each HARQ process shall investigate if any HARQ process has received an ACK with a TSN>$TSN_{HARQ}$ where TSN is in the range [lowest_transmitted_TSN; highest_transmitted_TSN]. If true the HARQ process shall resume the T1_NodeB. A person skilled in the art will appreciate that TSN number in [lowest_transmitted_TSN; highest_transmitted_TSN] may wrap around due to the modulo counting from TSN=63 to TSN=0.

Example

Assume NodeB transmit window is [3,7] meaning that it has transmitted TSN=3, 4, 5, 6, 7. TSN=3 has not been acknowledged yet by the receiver whilst others may. The HARQ process transmitting TSN=5 shall during a power drop investigate if TSN 6 or 7 is (or will be) acknowledged, and if so resume its T1_NodeB.

With this embodiment we include the step of checking if the UE has confirmed the reception of a higher TSN, i.e. "sent later" by NodeB, in the current transmit window which is an explicit indication that either;

a) the T1 timer in the UE has started, or
b) that all data has been correctly received.

In either of case a) or b) the preferred action is to resume the T1_NodeB; T1_UE.

According to a third embodiment of the invention a suspension of the T1_NodeB should be dependent upon service, which for certain traffic delays could be more critical than total throughput.

For example: A suspension of T1_NodeB should be based:
  a.—upon which transmit priority a UE has, or set based upon transmit priority per UE and per priority queue (if multiple queues exists), e.g. per MAC-d flow per user.
  b.—dependent on higher layer user priority, e.g. User Priority in IEEE 802.1D with 8 priority categories.
  c.—upon the mode of the RLC service offered to its higher layer, i.e. Transparent data transfer service, Unacknowledged data transfer Service and Acknowledged data transfer Service (see 3GPP 25.322).
  d.—could be set differently for VoIP services compared to other background data.

Referring to FIGS. 7-12, it has above been described that the second power is the HSPDA power and that the first discard timer T1_NodeB is suspended when the HSPDA power is lower than the selected second threshold level due to DCH traffic on the dedicated downlink channel DCH.

Figure 3:
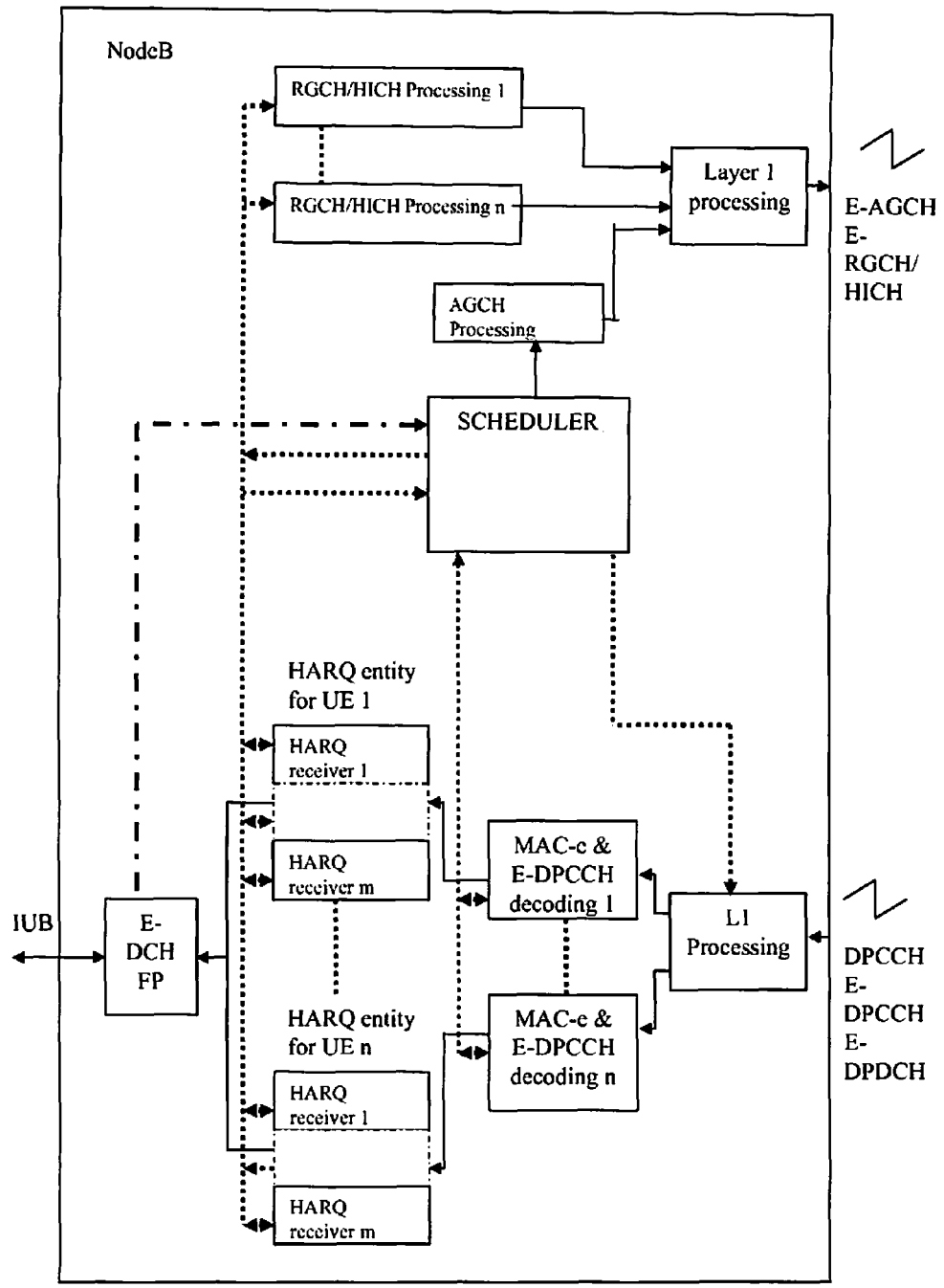
FIG. 3 schematically shows an overview of E-DCH parts in NodeB according to prior art.
Figure 4:
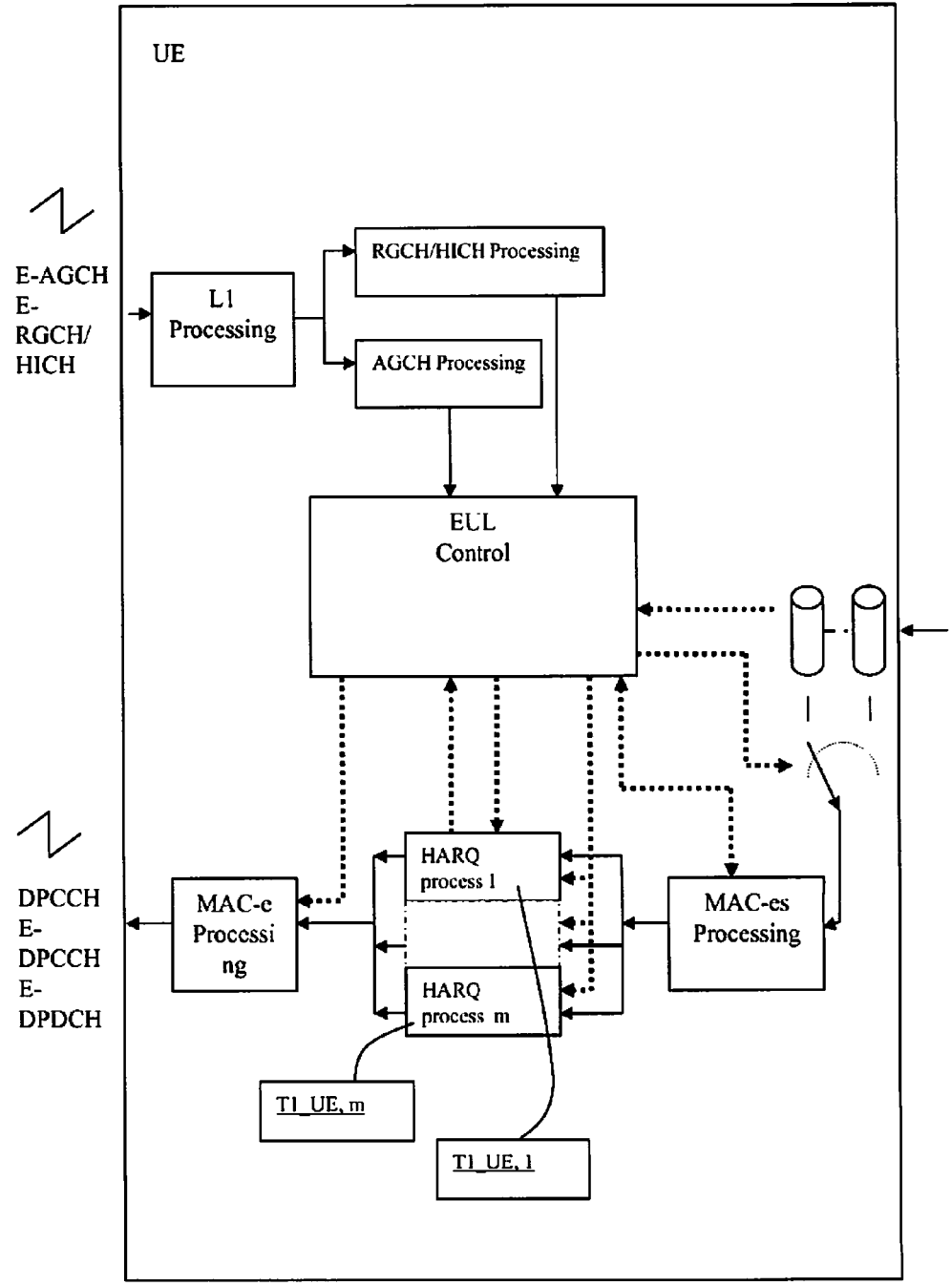
FIG. 4 schematically shows an overview of E-DCH parts in UE according to prior art.
Figure 5:
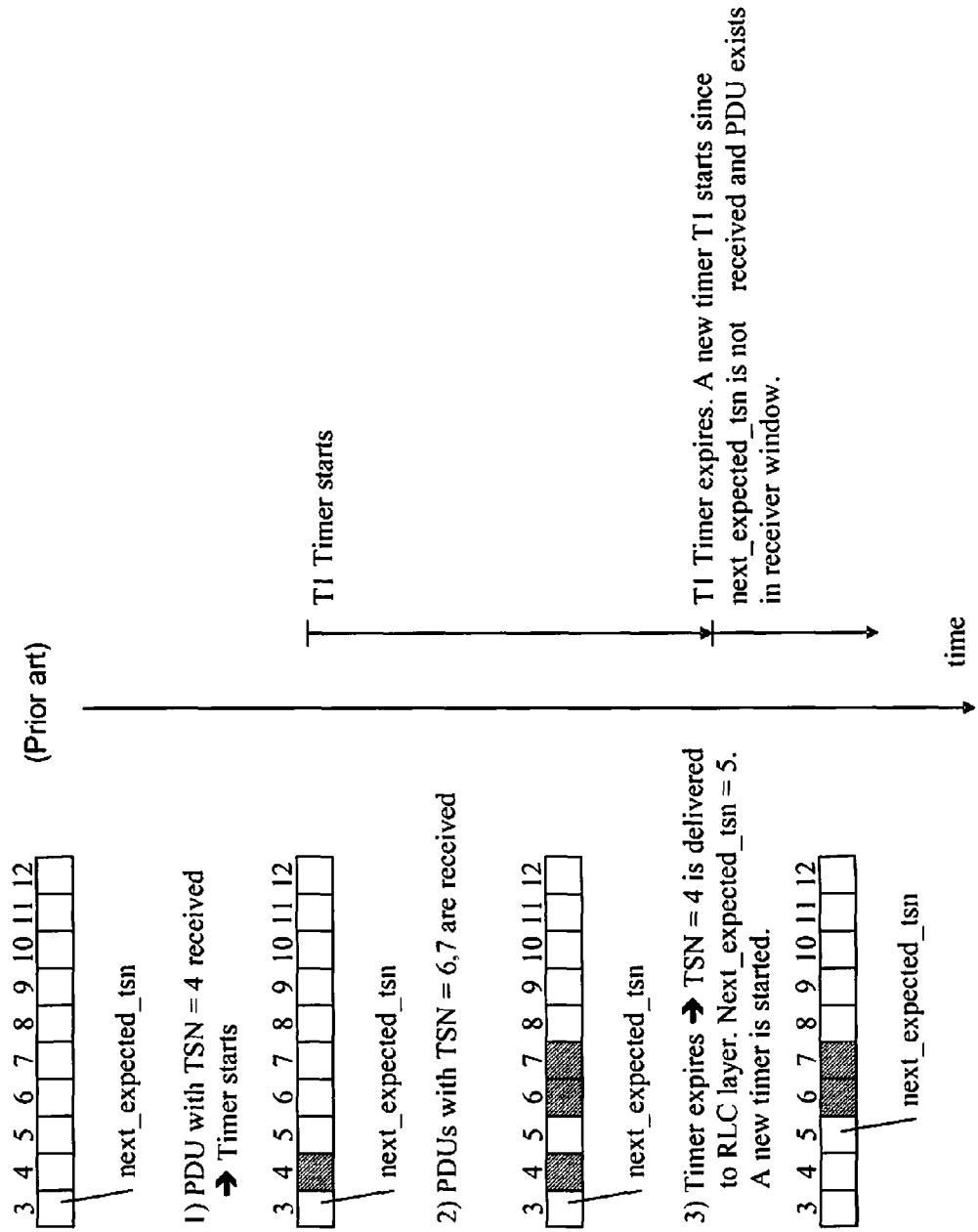
FIG. 5 schematically shows a scheme and flowchart over a timer based stall avoidance according to prior art.

As mentioned before, the transmitting unit may be a user equipment UE. Reference is here made to FIGS. 3 and 4. The UE is arranged to use HSUPA in an uplink direction, wherein the second dedicated channel is the scheduled data sent on an E-DCH. The second power E2 is then the HSUPA power and the maximum power Emax is the maximum transmit power of the UE. The first discard timer is suspended when the HSUPA power is lower than the selected second threshold level due to power limitation on the UE and/or DCH traffic on the first dedicated channel DCH. Hence, FIGS. 7-12 are valid also for the UE where E-DCH replaces HSDSCH for the HSUPA transmission.

To sum up, the transmitting unit in NodeB or UE is arranged to suspend the HARQ process by adding extra time to the first discard timer T1_NodeB; T1_UE in order to get scheduling permissions from the scheduler/MAC-e ctrl unit and increased probability for a successful reception at the receiving unit NodeB; UE.

It will be appreciated for those skilled in the art that the solutions presented above can be utilized for the sending side at an UE capable of Enhanced Uplink as well as for Long Term Evolution implemented in a NodeB or a UE.

The invention claimed is:

1. A wireless telecommunication system for voice and data packet transmission, the system comprising:
   a transmitting unit for transmitting voice and data packets to a receiving unit, the transmitting unit having a maximum power and being arranged to transmit high priority data on a first dedicated channel with a first power being of a magnitude within a first range ranging from zero to the difference between the maximum power and a selected first threshold level and low priority data on a second dedicated channel with a second power being of a magnitude within a second range ranging from zero to the difference between the maximum power minus the first power minus the first threshold level,
   the transmitting unit further comprising a first discard timer set for a first time period and arranged to start when a first data packet is transmitted from the transmitting unit, the transmitting unit being arranged to discard the first data packet if it has not been acknowledged by the receiving unit within the first time period or after a predetermined number of retransmissions of the first data packet, the transmitting unit being arranged to suspend the first discard timer when the second power is lower than or equal to a selected second threshold level.

2. The system according to claim 1, wherein the transmitting unit is arranged to use High Speed Downlink Packet Access (HSDPA) in a downlink direction.

3. The system according to claim 2, wherein the transmitting unit is a radio base station.

4. The system according to claim 2, wherein the second power is the HSPDA power, wherein the first discard timer is suspended when the HSPDA power is lower than the selected second threshold level due to downlink dedicated channel (DCH) traffic on the first downlink DCH.

5. The system according to claim 1, wherein the transmitting unit is a user equipment (UE).

6. The system according to claim 5, wherein the transmitting unit is arranged to use High Speed Uplink Packet Access (HSUPA) in an uplink direction, wherein the second dedicated channel is the scheduled data sent on an Enhanced Dedicated Channel (E-DCH).

7. The system according to claim 6, wherein the second power is the HSUPA power and where the maximum power is the maximum transmit power of the UE, wherein the first discard timer is suspended when the HSUPA power is lower than the selected second threshold level due to power limitation on the UE and/or DCH traffic on the first dedicated channel.

8. The system according to claim 5, wherein the transmitter complies with the Third Generation Partnership Project (3GPP) 3G or Long Term Evolution (LTE) standard or is capable of Enhanced Uplink.

9. The system according to claim 1, wherein the first discard timer is comprised in a Hybrid Automatic Repeat Request (HARQ) process.

10. The system according to claim 9, wherein the HARQ process is arranged to investigate if any HARQ process has received an ACK with a Transport Sequence Number (TSN)>$TSN_{HARQ}$, where TSN is in [lowest_transmitted_tsn, highest_transmitted_tsn]; and, if so, the HARQ process shall resume the first discard timer.

11. The system according to claim 1, wherein the high priority data on the first dedicated channel is voice data.

12. The system according to claim 1, wherein the suspension of the first discard timer is dependent upon service, and wherein suspension of the T1_NodeB is based at least one of the following:
   which transmit priority a UE has, or set based upon transmit priority per UE and per priority queue if multiple queues exists;
   higher layer user priority;
   the mode of the Radio Link Control (RLC) service offered to its higher layer, being transparent data transfer service, unacknowledged data transfer service and acknowledged data transfer service; and
   suspension of the discard timer being set differently for voice over internet protocol (VoIP) services compared to other background data.

13. A method for a wireless telecommunication system for voice and data packet transmission, comprising:
   transmitting voice and data packets from a transmitting unit to a receiving unit, wherein the transmitting unit has a maximum power and transmits high priority data on a first dedicated channel (DCH) with a first power being of a magnitude within a first range ranging from zero to the difference between the maximum power and a selected first threshold level and transmits low priority data on a second dedicated channel with a second power being of a magnitude within a second range ranging from zero to the difference between the maximum power minus the first power minus the first threshold level;
   setting a first discard timer in said transmitting unit for a first time period and starting it when a first data packet is transmitted from the transmitting unit;
   discarding the first data packet if it has not been acknowledged by the receiving unit within the first time period or after a predetermined number of retransmissions of the first data packet; and
   suspending the first discard timer when the second power is lower than or equal to a selected second threshold level.

14. The method according to claim 13, wherein the transmitting unit uses High Speed Downlink Packet Access (HSDPA) in a downlink direction.

15. The method according to claim 14, wherein the transmitting unit is a radio base station.

16. The method according to claim 13, wherein the second power is the HSPDA power, wherein the first discard timer is suspended when the HSPDA power is lower than the selected second threshold level due to DCH traffic on the first dedicated DCH.

17. The method according to claim 13, wherein the transmitting unit is a user equipment (UE).

18. The method according to claim 17, wherein the transmitting unit uses High Speed Uplink Packet Access (HSUPA) in an uplink direction, wherein the second DCH is the scheduled data sent on an Enhanced Dedicated Channel (E-DCH).

19. The method according to claim 18, wherein the second power is the HSUPA power and where the maximum power is the maximum transmit power of the UE, wherein the first discard timer is suspended when the HSUPA power is lower than the selected second threshold level due to power limitation on the UE and/or DCH traffic on the first DCH.

20. The method according to claim 17 wherein the transmitter is based on the Third Generation Partnership Project (3GPP) 3G or Long Term Evolution (LTE) standard or is capable of Enhanced Uplink.

21. The method according to claim 13, wherein the first discard timer is comprised in a Hybrid Acknowledgment Repeat Request (HARQ) process.

22. The method according to claim 21, wherein the HARQ process determines if any HARQ process has received an ACK with a TSN>$TSN_{HARQ}$ where TSN is in [lowest_transmitted_tsn, highest_transmitted_tsn]; and if so, the HARQ process resumes the first discard timer.

23. The method according to claim 13, wherein the high priority data on the first dedicated channel is voice data.

24. The method according to claim 13, wherein the suspension of the first discard timer is dependent upon service, and wherein suspension of the T1_NodeB is based on one of the following:

which transmit priority a UE has, or set based upon transmit priority per UE and per priority queue if multiple queues exists;

higher layer user priority;

the mode of the Radio Link Control (RLC) service offered to its higher layer, that being transparent data transfer service, unacknowledged data transfer service and acknowledged data transfer service;

the suspension of the discard timer being set differently for voice over internet protocol (VoIP) services compared to other background data.

* * * * *

UNITED STATES PATENT AND TRADEMARK OFFICE
CERTIFICATE OF CORRECTION

PATENT NO.       : 8,300,573 B2
APPLICATION NO.  : 12/681277
DATED            : October 30, 2012
INVENTOR(S)      : Lindskog et al.

Figure 1:
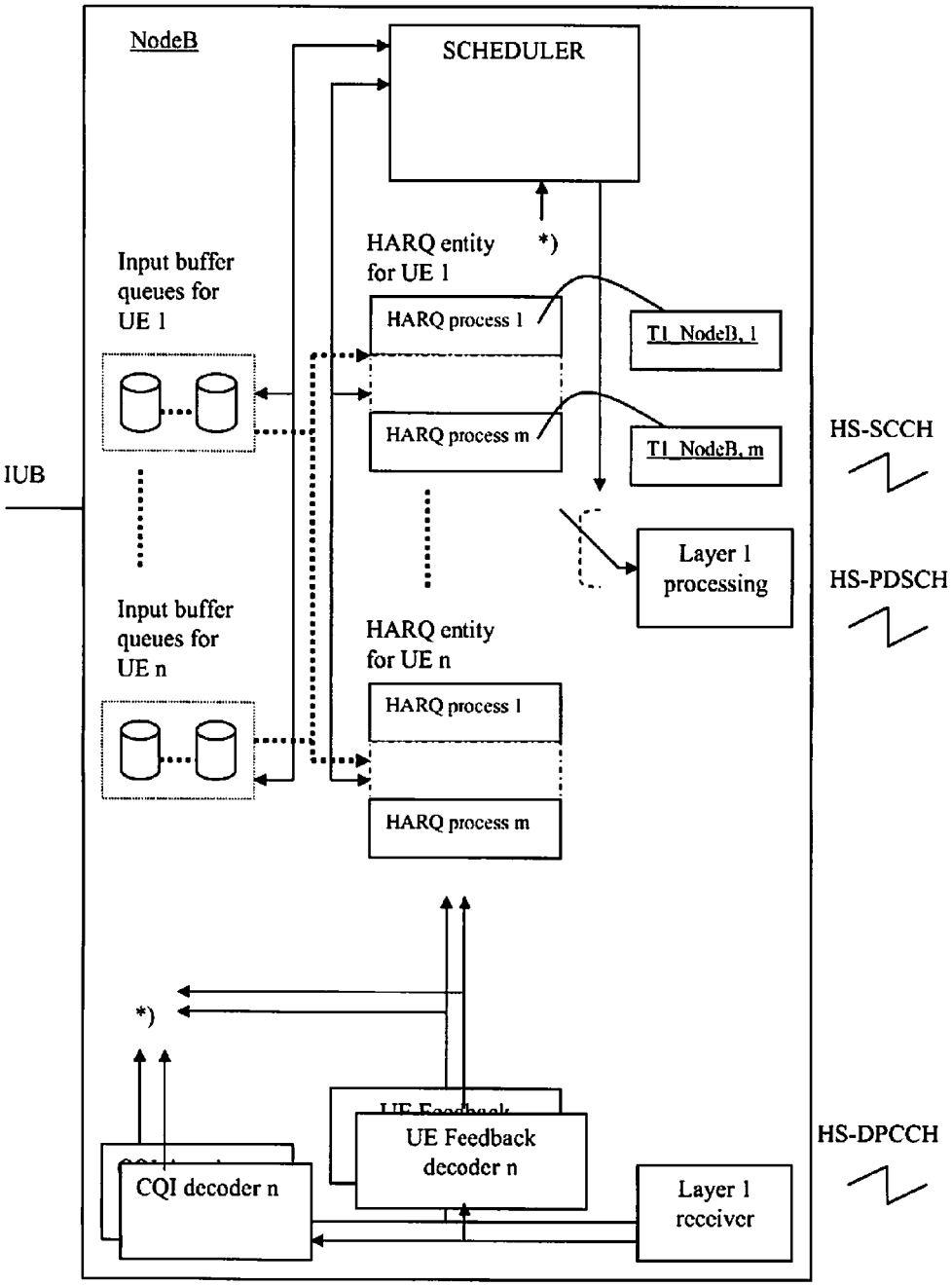
FIG. 1 schematically shows an overview of HS-DSCH in NodeB according to prior art.
Figure 2:
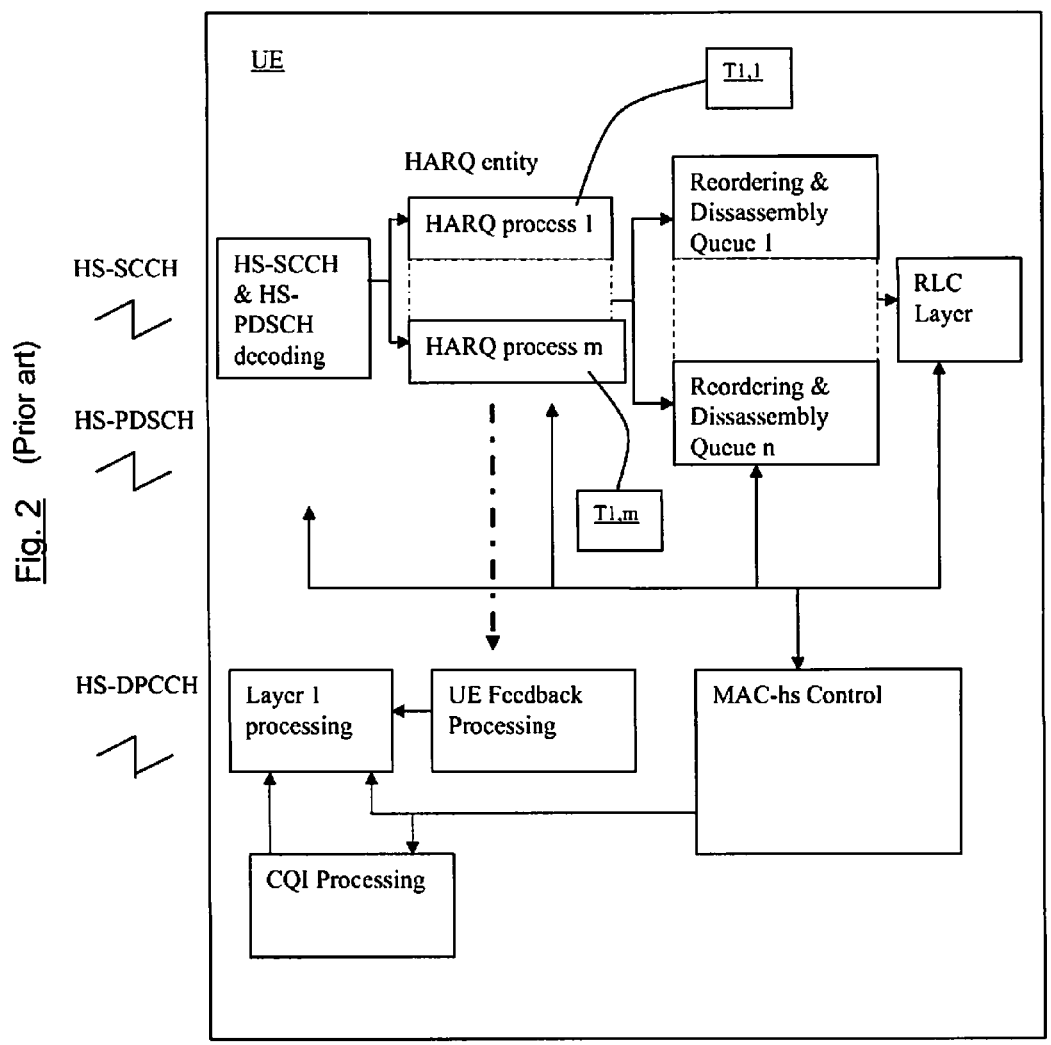
FIG. 2 schematically shows an overview of HS-DSCH in an UE according to prior art.

It is certified that error appears in the above-identified patent and that said Letters Patent is hereby corrected as shown below:

IN THE DRAWINGS:

In Fig. 2, Sheet 2 of 13, delete " 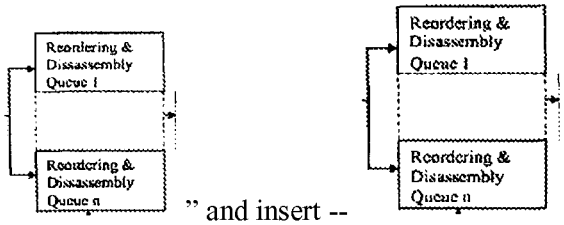 " and insert -- -- , therefor.

Figure 6:
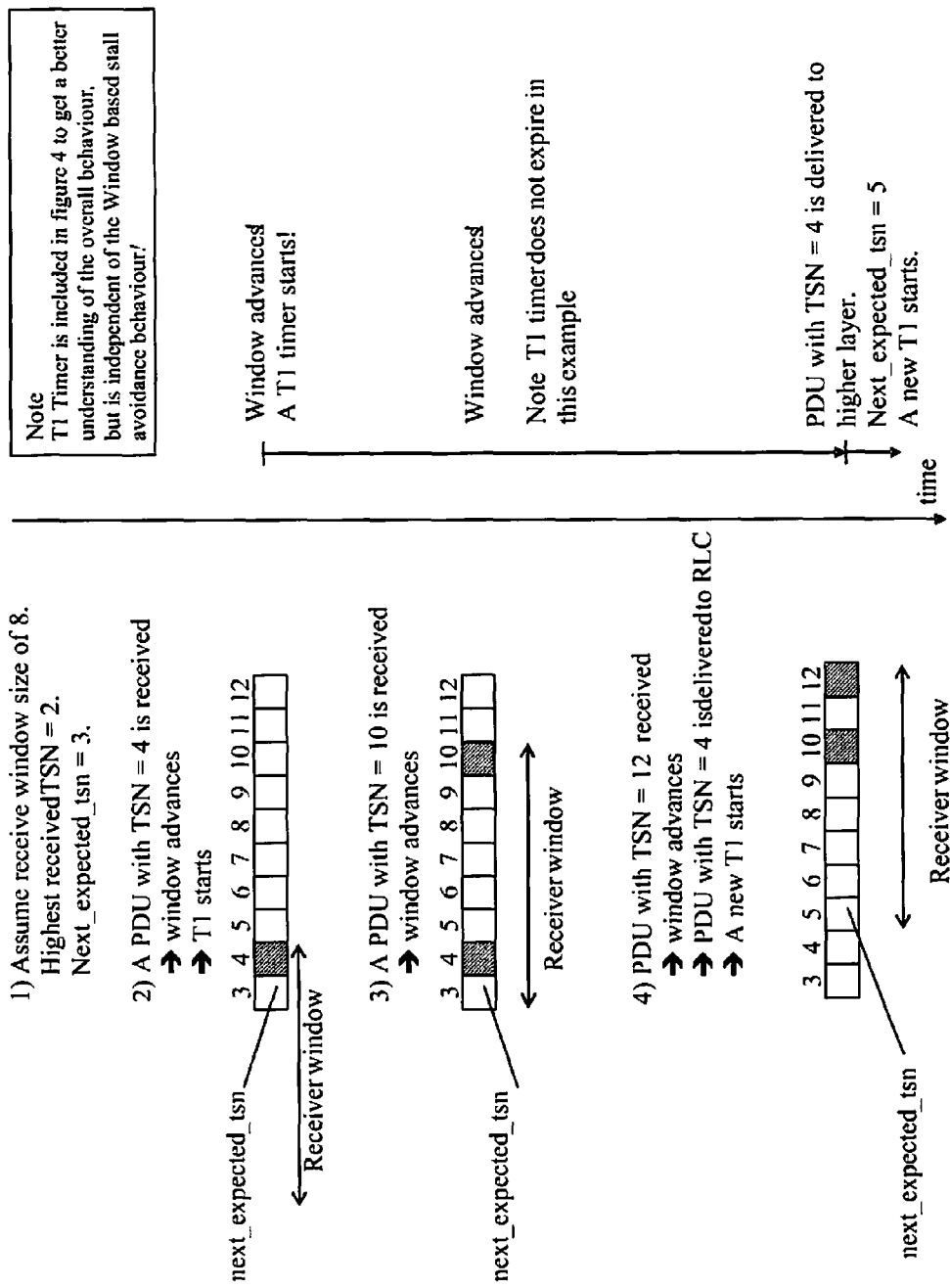
FIG. 6 schematically shows a scheme and flowchart over a window based stall avoidance according to prior art.

In Fig. 6, Sheet 6 of 13, for Point "4)", in Line 3, delete "isdeliveredto" and insert -- is delivered to --, therefor.

In Fig. 9, Sheet 9 of 13, delete "Prior art".

Figure 13:
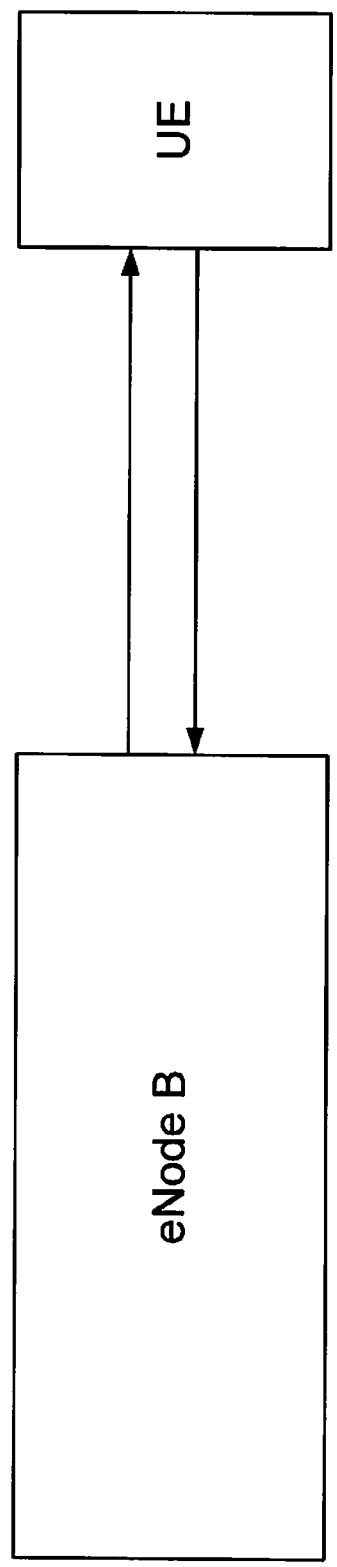
FIG. 13 is a block diagram of a system implementing the present invention.

In Fig. 13, Sheet 13 of 13, delete "FIGURE 13" and insert -- Fig. 13 --, therefor.

IN THE SPECIFICATIONS:

In column 4, Line 6, delete "schduler" and insert -- scheduler --, therefor.

In Column 4, Line 25, delete "HIGH" and insert -- HICH --, therefor.

In Column 4, Line 34, delete "RGCH/HIGH" and insert -- RGCH/HICH --, therefor.

In Column 4, Line 35, delete "HIGH" and insert -- HICH --, therefor.

In Column 4, Line 41, delete "HIGH" and insert -- HICH --, therefor.

In Column 4, Line 54, delete "Multiplex" and insert -- Multiple --, therefor.

Signed and Sealed this
Twelfth Day of March, 2013

Teresa Stanek Rea
*Acting Director of the United States Patent and Trademark Office*

CERTIFICATE OF CORRECTION (continued)
U.S. Pat. No. 8,300,573 B2

In Column 9, Line 27, delete "HSDP/HSUPA" and insert -- HSDPA/HSUPA --, therefor.

In Column 9, Line 30, delete "HSDPNHSUPA;" and insert -- HSDPA/HSUPA; --, therefor.

In Column 11, Line 56, delete "14" and insert -- 14. --, therefor.

IN THE CLAIMS:

In Column 14, Line 37, in Claim 13, delete "and" and insert -- and, --, therefor.